(12) United States Patent
Tian

(10) Patent No.: US 11,710,936 B2
(45) Date of Patent: Jul. 25, 2023

(54) CONNECTION DEVICE AND ELECTRONIC APPARATUS

(71) Applicant: Lenovo (Beijing) Co., Ltd., Beijing (CN)

(72) Inventor: Ping Tian, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 330 days.

(21) Appl. No.: 16/993,618

(22) Filed: Aug. 14, 2020

(65) Prior Publication Data

US 2021/0050698 A1    Feb. 18, 2021

(30) Foreign Application Priority Data

Aug. 14, 2019    (CN) .......................... 201910747714.1

(51) Int. Cl.
| | | |
|---|---|---|
| H01R 39/64 | (2006.01) | |
| H01R 35/04 | (2006.01) | |
| G06F 1/16  | (2006.01) | |
| H01R 39/00 | (2006.01) | |

(52) U.S. Cl.
CPC ........... H01R 35/04 (2013.01); G06F 1/1616 (2013.01); G06F 1/1652 (2013.01); G06F 1/1681 (2013.01); H01R 39/00 (2013.01); H01R 39/64 (2013.01)

(58) Field of Classification Search
CPC ........ H01R 35/04; H01R 39/00; H01R 39/64; G06F 1/1616; G06F 1/1652; G06F 1/1681
See application file for complete search history.

(56) References Cited

U.S. PATENT DOCUMENTS

| | | | | |
|---|---|---|---|---|
| 4,710,131 A | * | 12/1987 | Bonenberger | ......... H01R 35/04 439/13 |
| 6,559,383 B1 | * | 5/2003 | Martin | ................... H01R 35/04 174/21 C |
| 7,553,166 B2 | * | 6/2009 | Gobron | .................. H01R 12/78 439/287 |
| 8,769,771 B2 | * | 7/2014 | Hsu | ....................... G06F 1/1683 16/386 |
| 2014/0126121 A1 | | 5/2014 | Griffin et al. | |
| 2017/0357289 A1 | | 12/2017 | Ahn | |

FOREIGN PATENT DOCUMENTS

| | | | |
|---|---|---|---|
| CN | 105605084 A | 5/2016 | |
| CN | 106504648 A | 3/2017 | |
| CN | 206136000 U | 4/2017 | |
| CN | 107408362 A | 11/2017 | |
| CN | 109994048 A | 7/2019 | |
| DE | 202004017710 U1 * | 3/2005 | ......... H01R 13/5224 |

* cited by examiner

*Primary Examiner* — Tho D Ta
(74) *Attorney, Agent, or Firm* — Anova Law Group, PLLC

(57) ABSTRACT

A connection device includes two adjacent connectors, a first connecting portion, and a second connecting portion. The two adjacent connectors are configured to support a flexible member. The first connecting portion of a first connector of the two adjacent connectors is rotatably connected to the second connecting portion of a second connector of the two adjacent connectors. The first connector rotates relative to the second connector based on relative rotation between the first connecting portion and the second connecting portion. The two adjacent connectors rotate to a first limit position and a second limit position based the relative rotations between the first connector and the second connector.

17 Claims, 12 Drawing Sheets

US 11,710,936 B2

CONNECTION DEVICE AND ELECTRONIC APPARATUS

CROSS-REFERENCE TO RELATED APPLICATION

This application claims priority to Chinese Patent Application No. 201910747714.1, filed on Aug. 14, 2019, the entire content of which is incorporated herein by reference.

TECHNICAL FIELD

The present disclosure relates to a connection device and an electronic apparatus.

BACKGROUND

A connection device is an important structural piece of a laptop or other electronic devices. A connection device generally includes a plural of connectors. Adjacent connectors are movably connected. Often, a connector is only used to connect the adjacent structure components.

SUMMARY

Embodiments of the present disclosure provide a connection device. The connection device includes two adjacent connectors, a first connecting portion, and a second connecting portion. The two adjacent connectors are configured to support a flexible member. The first connecting portion of a first connector of the two adjacent connectors is rotatably connected to the second connecting portion of a second connector of the two adjacent connectors. The first connector rotates relative to the second connector based on relative rotation between the first connecting portion and the second connecting portion. The two adjacent connectors rotate to a first limit position and a second limit position based the relative rotations between the first connector and the second connector.

Embodiments of the present disclosure provide an electronic apparatus including a connection device, a first body, a second body, and a flexible member. The connection device includes two adjacent connectors, a first connecting portion, and a second connecting portion. The two adjacent connectors are configured to support a flexible member. The first connecting portion of a first connector of the two adjacent connectors is rotatably connected to the second connecting portion of a second connector of the two adjacent connectors.

The first connector rotates relative to the second connector based on relative rotation between the first connecting portion and the second connecting portion. The two adjacent connectors rotate to a first limit position and a second limit position based the relative rotations between the first connector and the second connector. The first body is connected to a connector of a first end of the two adjacent connectors. The second body is connected to a connector of a second end of the two adjacent connectors. The flexible member includes a first flat portion, a second flat portion, and a bendable portion. The first flat portion is fixed at the first body. The second flat portion is fixed at the second body. The bendable portion abuts the at least two connectors. When the first body rotates relative to the second body through the two adjacent connectors, the at least two adjacent connectors are at the first limit position, the bendable portion is in a bent state, and the first flat portion and the second flat portion are connected smoothly to the bendable portion in the bent state. When the two adjacent connectors are at the second limit position, the bendable portion is in a flattened state, and the first flat portion and the second flat portion are in a same plane with the bendable portion.

REFERENCE NUMERALS

Figure 1:
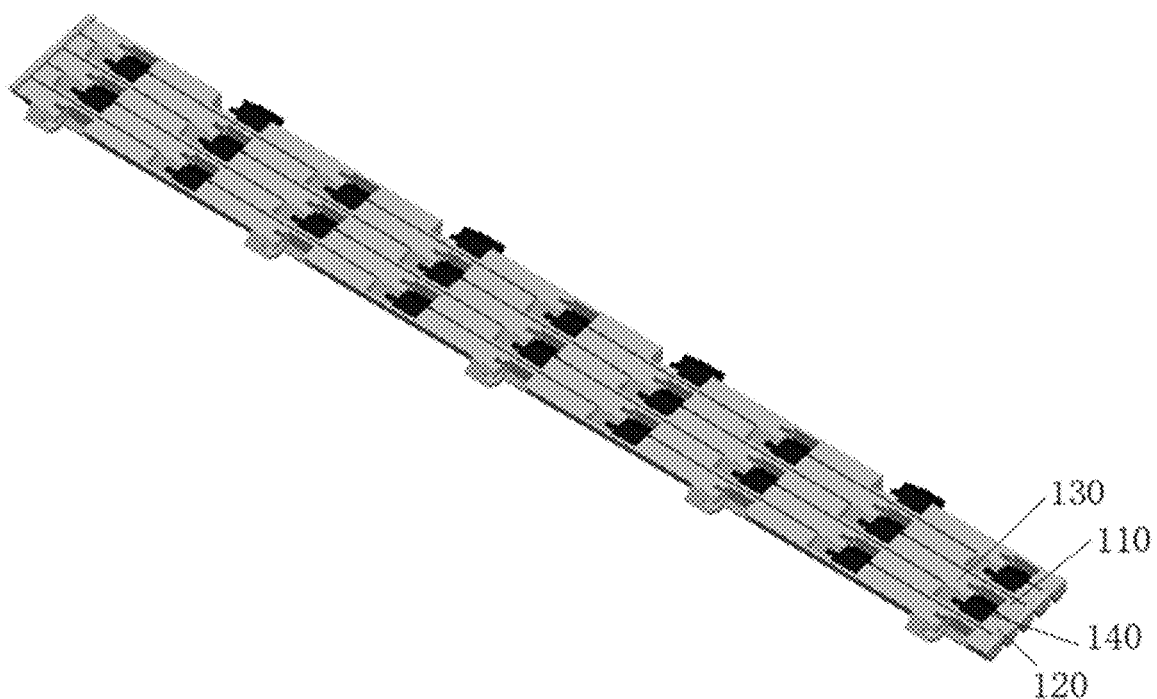
FIG. 1 illustrates a schematic structural diagram of a connection device according to some embodiments of the present disclosure.

101—first body
102—second body
110—first connector
111—first accommodation slot
120—second connector
121—second accommodation slot 130—first connecting portion
131—sliding groove
132—limiting groove
133—first arc surface
140—second connecting portion
141—protrusion structure
142—limiting protrusion
143—second arc surface
150—shielding protrusion
200—flexible member
210—first flat portion
220—second flat portion
230—bendable portion

DETAILED DESCRIPTION OF THE EMBODIMENTS

Specific embodiments of the present disclosure are described in detail in connection with accompanying drawings. Specific embodiments are merely used to explain the present disclosure but not used to limit the present disclosure.

In embodiments of the present disclosure, unless otherwise specified, the term "connection" used in the present disclosure should be understood in a board sense. For example, a connection may include an electrical connection, a connection inside two components, a direct connection, or an indirect connection through an intermediate medium. For those of ordinary skill in the art, the specific meaning of the above-mentioned terms may be understood according to specific circumstances.

In embodiments of the present disclosure, the term "first/second/third" is merely used to distinguish similar objects and does not represent a specific order of objects. The objects described by the term "first/second/third" may exchange the specific order or sequence under an allowable situation. The objects distinguished by "first\second\third" may be interchanged in an appropriate situation, such that embodiments of the present disclosure may be implemented in a sequence other than those illustrated or described in the accompanying drawings.

A connection device of embodiments of the present disclosure is described in detail in connection with FIGS. 1-14.

The connection device of embodiments of the present disclosure includes at least two connectors. The at least two connectors are configured to support a flexible member 200. A first connector 110 of adjacent connectors of the at least two connectors is provided with a first connecting portion 130. A second connector 120 of the adjacent connectors of the at least two connectors is provided with a second connecting portion 140. The first connecting portion 130 and the second connecting portion 140 are rotatably connected. The first connector 110 can rotate relative to the second connector 120 based on a rotating connection of the first connecting portion 130 and the second connecting portion 140. The at least two connectors can rotate to a first limit position and a second limit position based on the relative rotation between the first connector 110 and the second connector 120.

Figure 6:
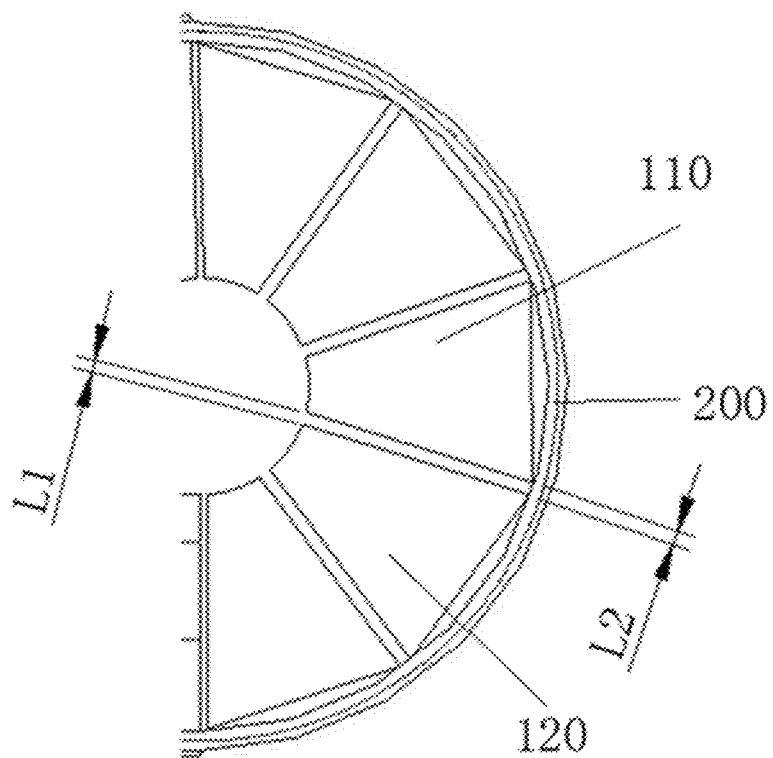
FIG. 6 illustrates a schematic structural diagram of the connection device according to some embodiments of the present disclosure.
Figure 7:
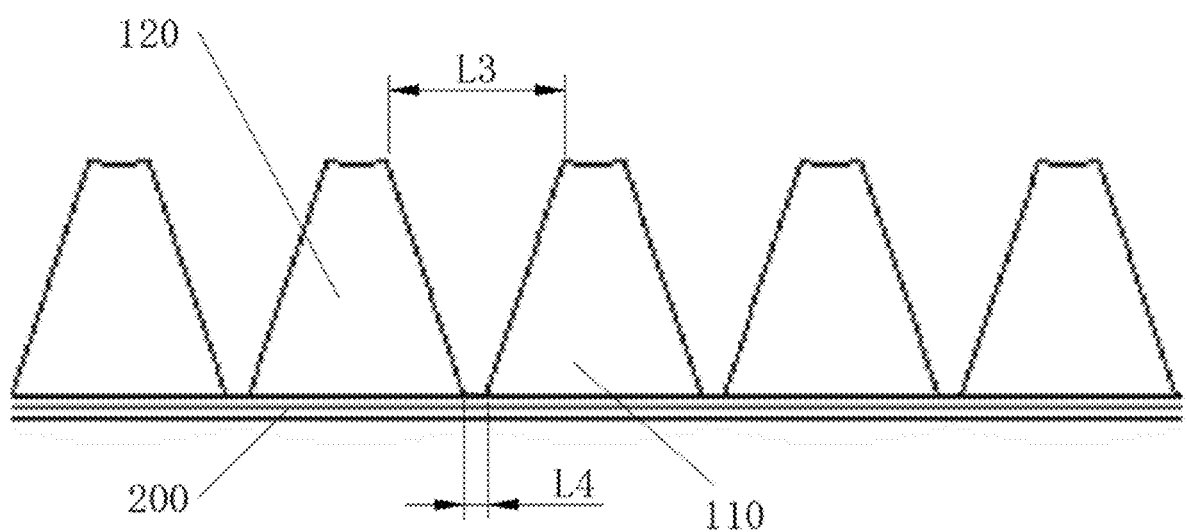
FIG. 7 illustrates a schematic structural diagram of the connection device according to some embodiments of the present disclosure.

In some embodiments of the present disclosure, a specific state in which the at least two connectors are at the first limit position and the second limit position is not limited. For example, as shown in FIG. 6, when the at least two connectors are at the first limit position, the at least two connectors are in a bent state. As shown in FIG. 7, when the at least two connectors are at the second limit position, the at least two connectors are in a flattened state.

When the at least two connectors are at the first limit position or the second position, the at least two connectors maybe both in a bent state or a flattened state.

A connector located on the side of the at least two connectors may only be served as a first connector 110 or a second connector 120. That is, the connector located at the side may only include a first connecting portion 130 or a second connecting portion 140. A connector located in the middle of the at least two connectors may be served as a first connector 110 and a second connector 120. That is, the connector located in the middle of the at least two connectors may include the first connecting portion 130 and the second connecting portion 140. As such, the at least two connectors may rotate based on the relative rotation between the first connector 110 and the second connector 120.

Figure 13:
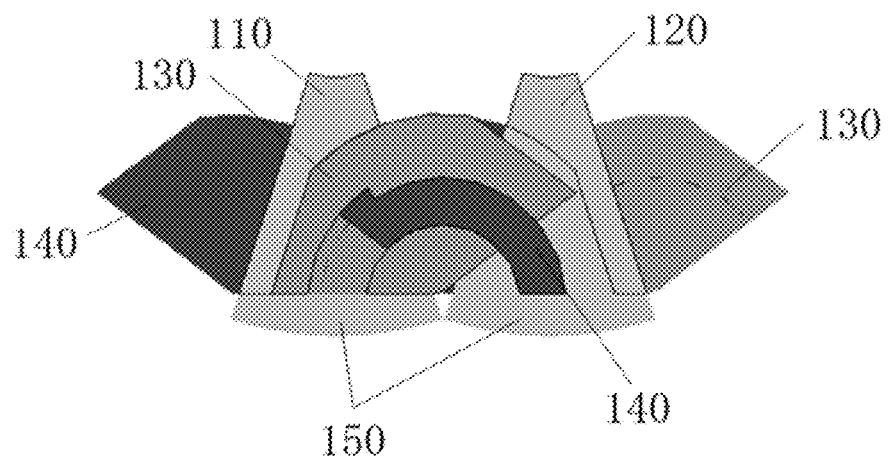
FIG. 13 illustrates a schematic local structural diagram of the connection device according to some embodiments of the present disclosure.
Figure 14:
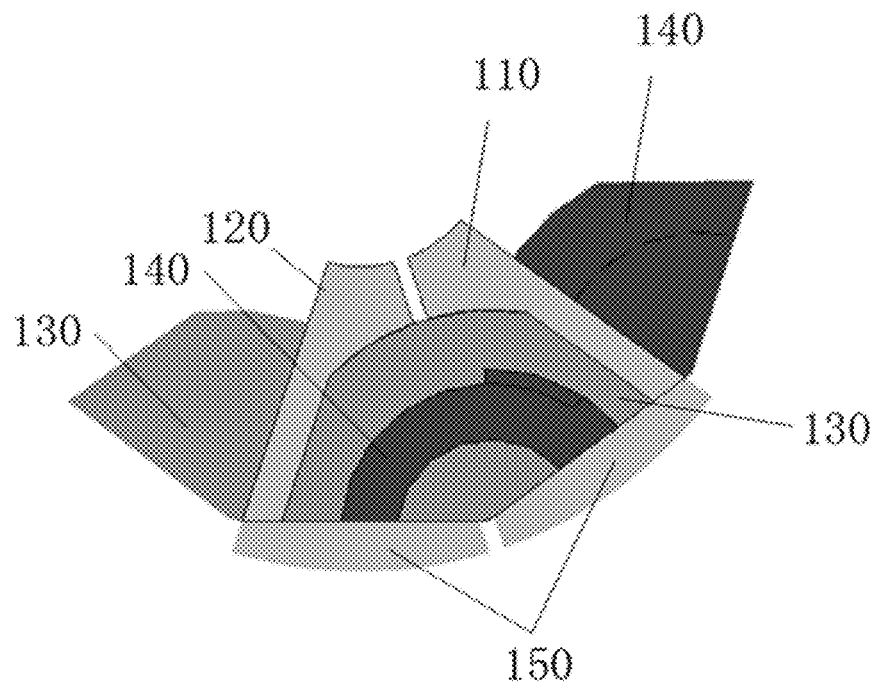
FIG. 14 illustrates a schematic local structural diagram of the connection device according to some embodiments of the present disclosure.

For example, the second connecting portion 140 is provided on a second side of the first connector 110. As shown in FIG. 13 and FIG. 14, the second side of the first connector 110 is provided oppositely to the first side of the first connector 110. The first connecting portion 130 on the first side of the first connector 110 and the second connecting portion 140 on the second side of the first connector 110 are arranged staggered. The first connector 110 is in the middle of the at least two connectors.

Figure 2:
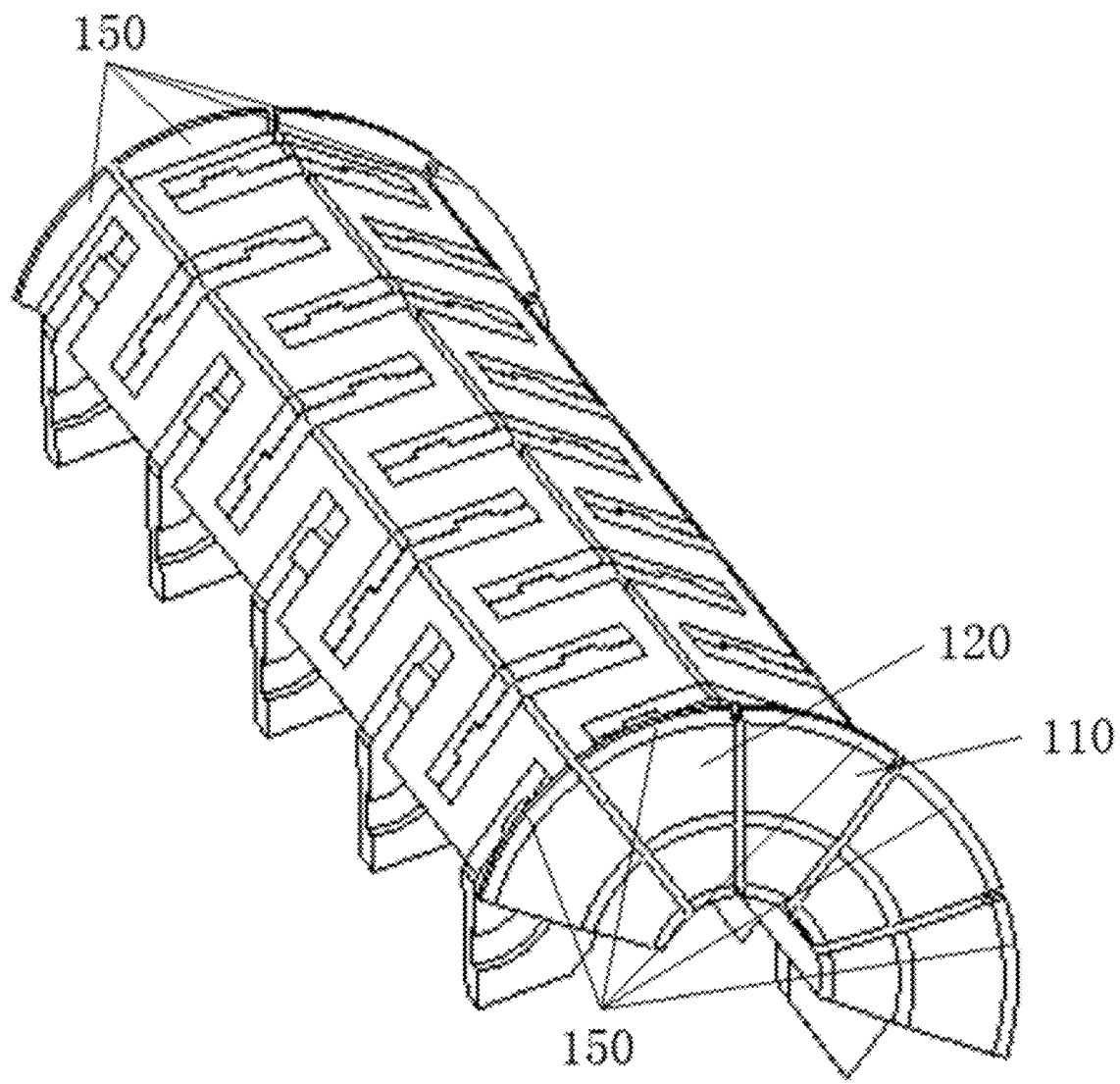
FIG. 2 illustrates a schematic local structural diagram of the connection device according to some embodiments of the present disclosure.

In some embodiments, the number of the at least two connectors is not limited. For example, as shown in FIG. 1 and FIG. 2, the number of at least two connectors is five.

The shape of the connector is not limited. For example, the connector may include a rectangle structure or a columnar structure.

A connector structure is not limited. For example, the connector includes a shielding protrusion 150. The shielding protrusion 150 is located over two ends of the connector to make the appearance of the adjacent connectors uniform. The two ends refer to two ends of the connector along a length direction. The shielding protrusion 150 structure is not limited. For example, as shown in FIG. 13 and FIG. 14, the shielding protrusion 150 structure has a sector-shape.

In some embodiments, the structure of the flexible member 200 is not limited. For example, the flexible member 200 may be a leather piece. In another example, the flexible member 200 may also be a flexible screen.

How the connector supports the flexible member 200 is not limited. For example, the connector may support the flexible member 200 through a bump. In another example, the connector may also support the flexible member 200 through a surface.

In some embodiments, when the at least two connectors are at the first limit position, the at least two connectors are configured to support the flexible member 200 in a bent state. As shown in FIG. 6, the flexible member 200 contacts two supporting ends of the connector. When the at least two connectors are at the second limit position, the at least two connectors are configured to support the flexible member 200 in an unfolded state. As shown in FIG. 7, the flexible member 200 contacts the supporting surface of the connector to make the flexible member 200 flat without wrinkles. Supporting the flexible member 200 by the supporting surface may prevent the flexible member 200 from collapsing in the supporting area of the connector.

Figure 4:
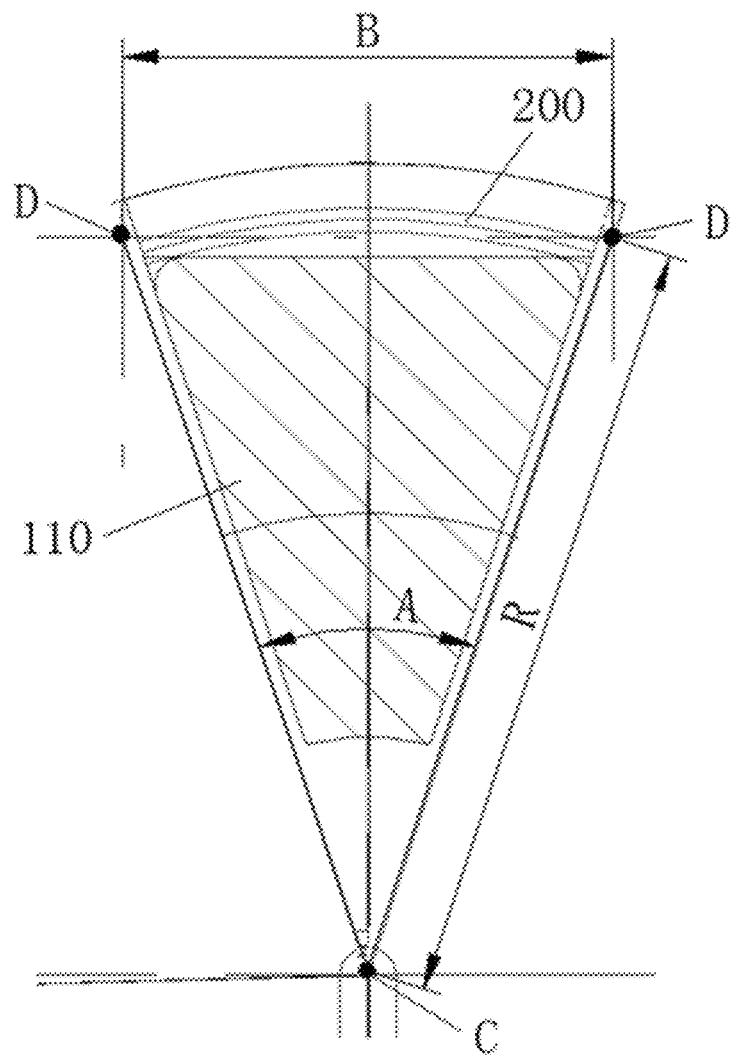
FIG. 4 illustrates a schematic structural diagram of a connector of the connection device according to some embodiments of the present disclosure.

In some embodiments, the shape of the cross-section of the connector may be triangular or trapezoidal. As shown in FIG. 6, two supporting ends of the connector are pointed ends. As shown in FIG. 4, the two supporting ends of the connector are smooth. As such, the two supporting ends of the connector may include arc surfaces to prevent the connector from damaging the flexible member 200.

In some embodiments, the two supporting ends are the supporting ends of the connector in a width direction.

In some embodiments of the present disclosure, the structures of the first connecting portion 130 and the second connecting portion 140 are not limited, as long as the first connecting portion 130 and the second connecting portion 140 are rotatably connected. For example, the first connecting portion 130 may include a connection hole. The second connecting portion 140 may include a connecting convex shaft. The convex shaft is sleeved in the connection hole. The convex shaft may rotate relative to the connection hole.

The number of the first connecting portion 130 and the second connecting portion 140 is not limited. For example, as shown in FIG. 1, the first connector 110 includes at least two first connecting portions 130. The second connector 120 includes at least two second connecting portions 140, such that the first connector 110 and the second connector 120 are connected by a plurality of first connecting portions 130 and second connecting portions 140.

The first connecting portion 130 and the first connector 110 may be an integral structure or a split structure.

The second connecting portion 140 and the second connector 120 may be an integral structure or a split structure.

Figure 8:
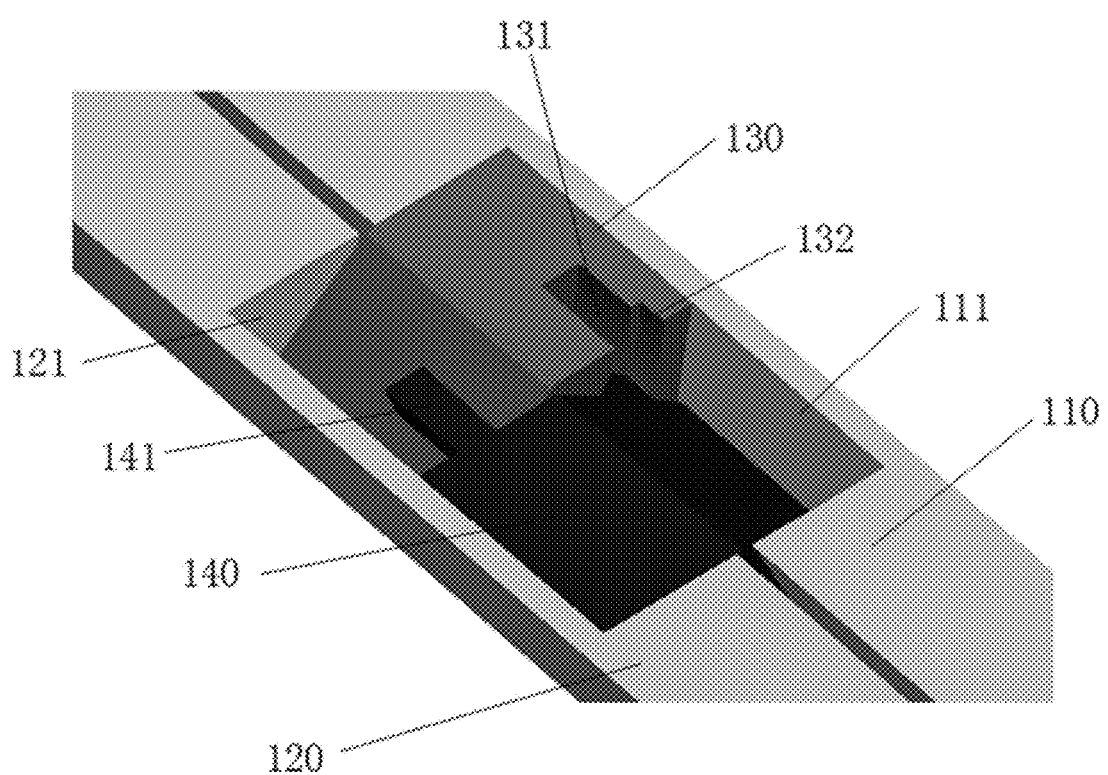
FIG. 8 illustrates a schematic structural diagram of the connection device according to some embodiments of the present disclosure.
Figure 9:
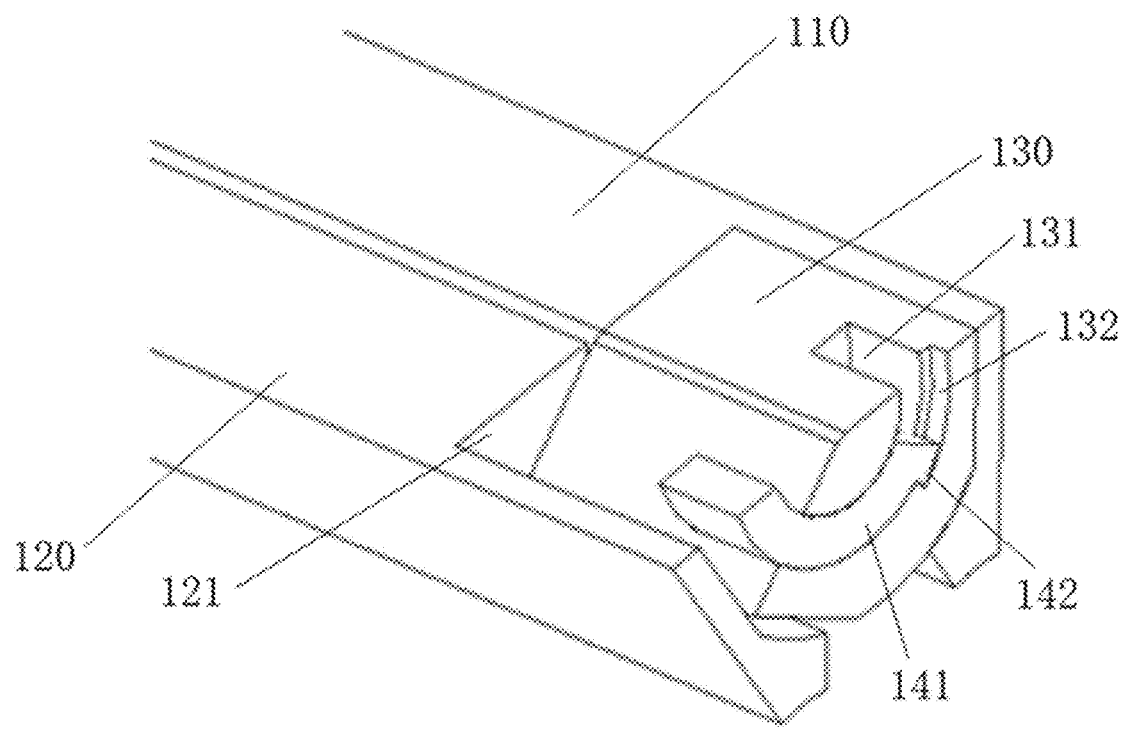
FIG. 9 illustrates a schematic structural diagram of the connection device according to some embodiments of the present disclosure.

For example, as shown in FIG. 8 and FIG. 9, the connection device further includes a first accommodation slot 111 and a second accommodation slot 121. The first accommodation slot 111 is provided on a first side of the first connector 110. A first part of the first connecting portion 130 is fixed in the first accommodation slot. The second accommodation slot 121 is provided on a first side of the second connector 120. The second accommodation slot 121 and the first accommodation slot 111 are provided oppositely. A first part of the second connecting portion 140 is fixed in the second accommodation slot 121. A part of the first connecting portion 130 is located in the second accommodation slot 121. The volume of the part of the first connecting portion 130 located in the second accommodation slot 121 changes with the relative rotation of the first connector 110 and the second connector 120. A part of the second connecting portion 140 is in the first accommodation slot 111. The volume of the part of the second connecting portion 140 in the first accommodation slot 111 changes with the relative rotation of the first connector 110 and the second connector 120.

The first connecting portion 130 and the first connector 110 are provided as a split structure, and the second connecting portion 140 and the second connector 120 are provided as a split structure. As such, it is convenient to process and manufacture the first connecting portion 130, the first connector 110, the second connecting portion 140, and the second connector 120.

The shapes of the first accommodation slot 111 and the second accommodation slot 121 are not limited. For example, the cross-section of the first accommodation slot 111 and the second accommodation slot 121 may both be sector-shaped.

In some embodiments, the connector may include a large end and a small end. The large end of the connector is configured to support the flexible member 200. When the at least two connectors are at the first limit position, as shown in FIG. 6, a first distance L1 exists between the small ends of the adjacent connectors, and a second distance L2 exists between the large ends of the adjacent connectors. When the at least two connectors are at the second limit position, as shown in FIG. 7, a third distance L3 exists between the small ends of the adjacent connectors, and a fourth distance L4 exists between the large ends of the adjacent connector. As such, the connector supports the flexible member 200 through the large end with a relatively larger surface area.

In some embodiments, the shape of the cross-section of the connector is not limited. For example, the shape of the cross-section of the connector may be triangular, trapezoidal, or sector-shaped. For example, as shown in FIG. 6 and FIG. 7, the shape of the cross-section of the connector is similar to a triangular.

In some embodiments, the value of the third distance L3 is longer than the value of the first distance L1. The value of the fourth distance L4 is longer than the value of the second distance L2. That is, when the at least two connectors are at the first limit position, the distance between the two adjacent connectors of the at least two connectors is a minimum distance. When the at least two connectors are at the second limit position, the distance between the two adjacent connectors of the at least two connectors is a maximum distance.

In some embodiments, the first connector 110 rotates relative to the second connector 120 in the first direction. When the distance between the small ends of the first connector 110 and the small end of the second connector 120 is minimum, and the distance between the large end of the first connector 110 and the large end of the second connector 120 is minimum, the at least two connectors are at the first limit position. When the first connector 110 gradually rotates relative to the second connector 120, the distance between the small end of the first connector 110 and the small end of the second connector 120 is gradually increased. Thus, the distance between the large end of the first connector 110 and the large end of the second connector 120 is gradually increased. As such, the at least two connectors gradually rotate from the first limit position to the second limit position. When the first connector 110 rotates relative to the second connector 120 until the distance between the small end of the first connector 110 and the small end of the second connector 120 is maximum, and the distance between the large end of the first connector 110 and the large end of the second connector 120 is the maximum, the at least two connectors are at the second limit position.

In some embodiments, the first connector 110 rotates relative to the second connector 120 in the second direction. When the distance between the small end of the first connector 110 and the small end of the second connector 120 is maximum, and distance between the large end of the first connector 110 and the large end of the second connector 120 is maximum, the at least two connectors are at the second limit position. When the first connector 110 gradually rotates relative to the second connector 120, the distance between the small end of the first connector 110 and the small end of the second connector 120 is gradually decreased, and the distance between the large end of the first connector 110 and the large end of the second connector 120 is gradually decreased. As such, the at least two connectors gradually rotate from the second limit position to the first limit position. When the first connector 110 rotates relative to the second connector 120 until the distance between the small end of the first connector 110 and the small end of the second connector 120 is minimum, and the distance between the large end of the first connector 110 and the large end of the second connector 120 is the minimum, the at least two connectors are at the first limit position. The first direction is opposite to the second direction.

In some embodiments, when the at least two connectors are at the first limit position, the value of the first distance L1 may be equal to the value of the second distance L2.

In some embodiments, the value of the third distance L3 is much longer than the value of the first distance L1. The value of the fourth distance L4 and the value of the second distance L2 have a small difference. When the at least two connectors rotate, change of the distance between the small end of the first connector 110 and the small end of the second connector 120 is relatively large. That is, it can be seen that the small end of the first connector 110 and the small end of the second connector 120 gradually approach or move away from each other. The change of the distance between the large end of the first connector 110 and the large end of the second connector 120 is relatively small.

Figure 3:
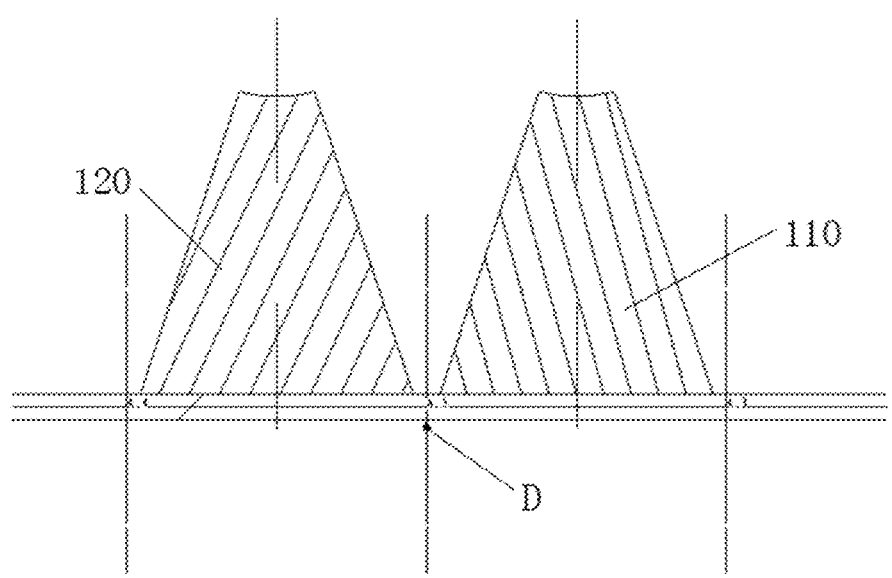
FIG. 3 illustrates a schematic structural diagram of the connection device according to some embodiments of the present disclosure.

In some embodiments of the present disclosure, as shown in FIG. 3, the first connector 110 rotates relative to the second connector 120 about a first rotation center based on the rotating connection of the first connecting portion 130 and the second connecting portion 140. The first rotation center is on a side of the flexible member 200 which is supported by the first connector 110 and the second connector 120. The first rotation center is outside of the first connector 110 and the second connector 120.

In some embodiments, the implementation is not limited for rotatably connecting the first connecting portion 130 and the second connecting portion 140 to cause the first rotation center to be outside the first connector 110 and the second connector 120.

For example, the first connecting portion 130 may include a first arc surface. The second connecting portion 140 may include a second arc surface. The second arc surface contacts a first part of the first arc surface, such that the second arc surface may rotate relative to the first arc surface about the first rotation center. The first connector 110 and the second connector 120 can rotate relative to each other based on the relative rotation between the first arc surface relative and the second arc surface. The location of the first rotation center is not fixed.

In another example, the first connecting portion 130 may include a first arc surface. The second connecting portion 140 may include a second arc surface. The second arc surface contacts the first arc surface, such that the second arc surface may rotate relative to the first arc surface about the first rotation center D. The first connector 110 and the second connector 120 can rotate relative to each other based on the relative rotation between the first arc surface and the second arc surface. The first arc surface and the second arc surface are concentric, and the center of the first arc surface and the center of the second arc surface both are outside the first connector 110 and the second connector 120. The position of the first rotation center is fixed.

The arc of the first arc surface may be equal to the arc of the second arc surface. The first rotation center D may be at the symmetrical plane of the adjacent connectors of the at least two connectors. The first rotation center D may not be at the symmetrical plane of the adjacent connectors of the at least two connectors.

Figure 5:
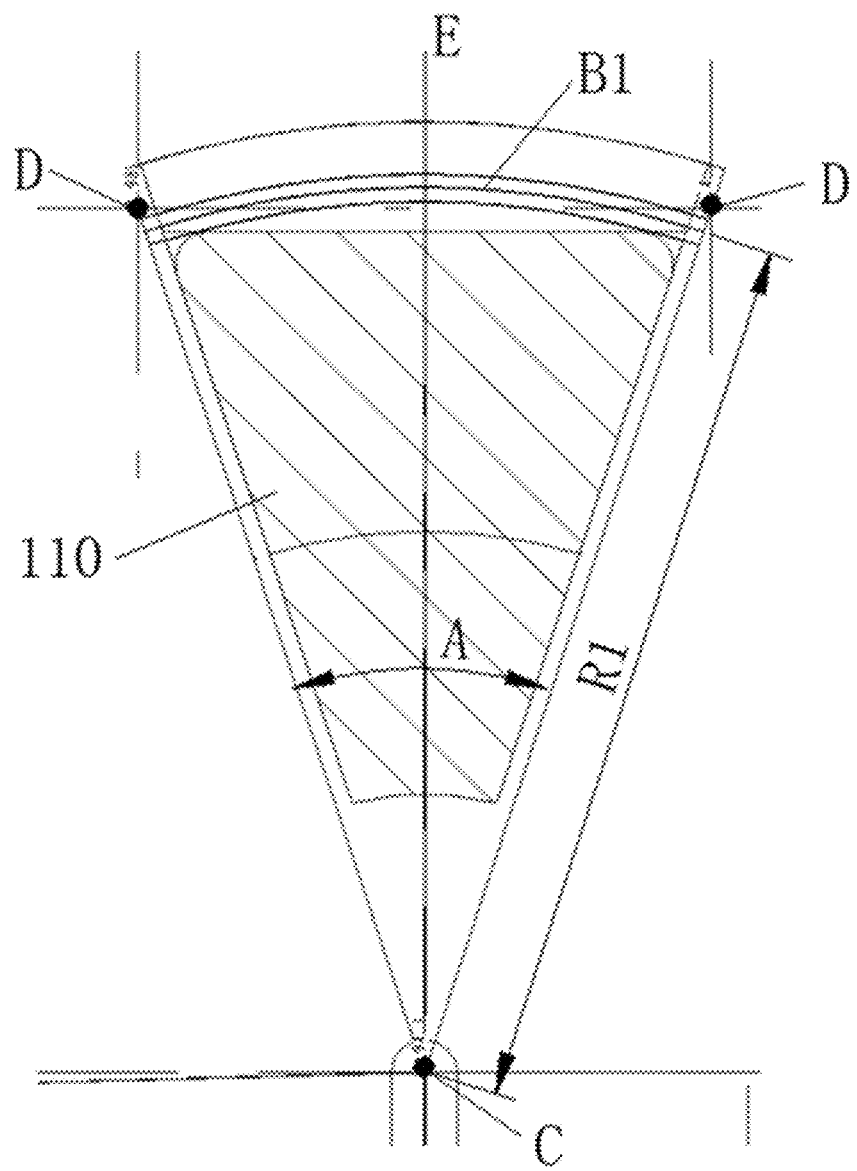
FIG. 5 illustrates a schematic structural diagram of the connector of the connection device according to some embodiments of the present disclosure.

In some embodiments, as shown in FIG. 5, when the at least two connectors are at the first limit position, the connector supports the flexible member 200 to have a first length B1. As shown in FIG. 4, when the at least two connectors are at the second limit position, the connector supports the flexible member 200 to have a second length B.

When the at least two connectors are at the first limit position and the at least two connectors are used to support the flexible member 200 in a bent state, the first length B1 is an arc length. The calculation formula of the first length B1 is: $B1 = A \times \pi \times R1/180$, where A denotes a central angle corresponding to the connector, $\pi$ denotes the circumference ratio, and R1 denotes a radius corresponding to the flexible member 200.

As shown in FIG. 5, when the shape of the cross-section of the connector is a symmetrical structure, and the at least two connectors are at the first limit position, center C is an intersection of a symmetry line E of the cross-section of each connector. As such, the symmetry lines E of the cross-sections of all connectors intersect at the center C.

The central angle A is an angle formed by the two first rotation centers D corresponding to the connector and the center C. R1 is a distance between the neural surface of the flexible member 200 and the center C, that is, $R1 = L5 + H/2$. L5 denotes a distance between the support end of the connector and the center C, and H denotes a thickness of the flexible member 200.

As shown in FIG. 4, when the at least two connectors are at the second limit position, and the at least two connectors are used to support the flexible member 200 in the unfolded state, the second length B can be a chord length. The calculation formula of the second length B is $B = 2R \times \mathrm{SIN}(A/2)$, where A denotes the central angle corresponding to the connector, and R denotes the rotation radius corresponding to the connector.

The central angle A is an angle formed by the two first rotation centers D corresponding to the connector and the center C. R is the distance between the first rotation center D and the center C.

The first length B1 may be equal to the second length B. As such, at both first limit position and second limit position, the flexible member 200 is in a flat state without wrinkles. In this case, $B1 = B$, $A \times \pi \times R1/180 = 2R \times \mathrm{SIN}(A/2)$, such that correspondence between R and R1 may be calculated. Those skilled in the art can set the size of the angle A according to actual needs and design the structure of the connector based on the correspondence between R and R1.

The calculation for designing the above-described connector is merely an example. Those skilled in the art may adjust according to the actual needs.

In some embodiments, the first length B1 may not be equal to the second length B.

In some embodiments, the first connecting portion 130 may include a first arc surface. The second connecting portion 140 may include a second arc surface. The second arc surface contacts the first arc surface. The second arc surface may rotate relative to the first arc surface about the first rotation center. Therefore, the first connector 110 may rotate relative to the second connector 120 based on the relative rotation between the first arc surface and the second arc surface.

In some embodiments, the first rotation center may be outside of the first connector 110 and the second connector 120, or in the first connector 110 or the second connector 120.

In some embodiments, when an external force is applied, the first connector 110 may rotate relative to the second connector 120 based on the relative rotation between the first arc surface and the second arc surface. When the external force is removed, the first connector 110 may maintain the position relationship with the second connector 120 based on friction between the first arc surface and the second arc surface. That is, the at least two connectors may be in a stable state through the friction between the first arc surface and the second arc surface. Therefore, the at least two connectors may be stably located at any position between the first limit position and the second limit position.

Those of skill in the art may also maintain the position relationship between the first connector 110 and the second connector 120 through other methods.

In some embodiments, the structures of the first arc surface and the second arc surface may not be limited.

For example, as shown in FIG. 8 and FIG. 9, the first connecting portion 130 includes a circular sliding groove 131. A sidewall of the sliding groove 131 forms the first arc surface 133. The sliding groove 131 forms two first arc surfaces 133. The second connecting surface 140 may include a circular protrusion structure 141. The protrusion structure 141 is inserted into the sliding groove 131. The protrusion structure 141 may rotate relative to the sliding groove 131 about the first rotation center. A sidewall of the protrusion structure 141 forms a second arc surface 143. The protrusion structure 141 forms two-second arc surfaces 143.

In some embodiments, the connecting portion 130 may only include one first arc surface 133. For example, the first connecting portion 130 may be a sliding groove 131 having a sector cross-section. The second connecting portion 140 may also only include one-second arc surface 143. For example, the second connecting portion 140 may be a protrusion structure 141 having a sector cross-section.

Figure 11:
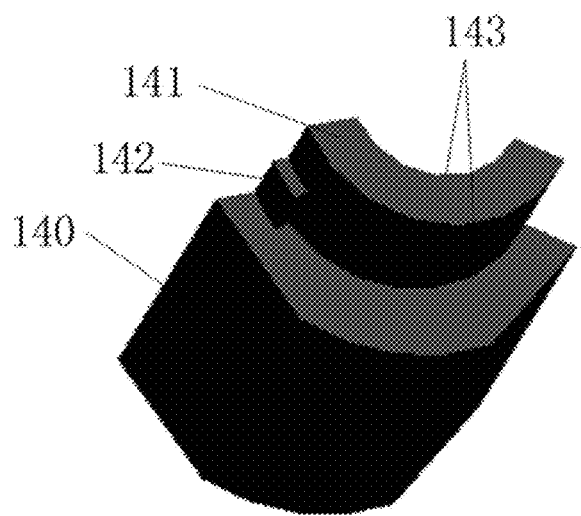
FIG. 11 illustrates a schematic structural diagram of a first connecting portion according to some embodiments of the present disclosure.
Figure 12:
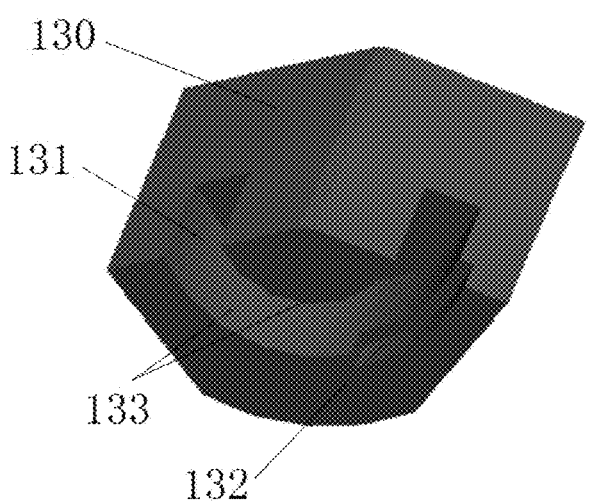
FIG. 12 illustrates a schematic structural diagram of a second connecting portion according to some embodiments of the present disclosure.

In some embodiments, as shown in FIG. 9, the connection device further includes a limiting groove 132 and a limiting protrusion 142. As shown in FIG. 12, the limiting groove 132 is placed on an inner sidewall of the sliding groove 131. As shown in FIG. 11, the limiting protrusion 142 is placed on the protrusion structure 141. The position of the limiting protrusion 142 corresponds to the position of the limiting groove 132. The protrusion structure 141 may slide in the sliding groove 131. The limiting protrusion 142 may slide in the limiting groove 132. As shown in FIG. 13, when the limiting protrusion 142 abuts the sidewall of the limiting groove 132, the at least two connectors are at the second limit position.

Figure 10:
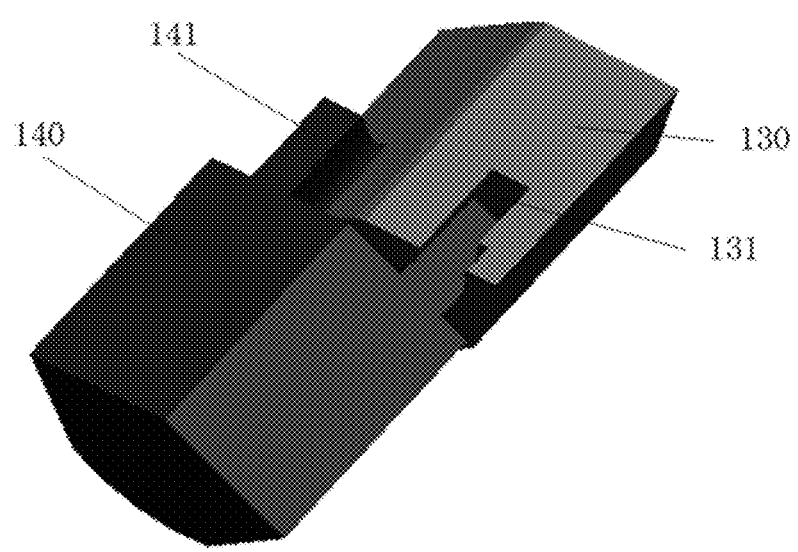
FIG. 10 illustrates a schematic local structural diagram of the connection device according to some embodiments of the present disclosure.

The shape of the limiting groove 132 is not limited. For example, as shown in FIG. 10 and FIG. 12, the limiting groove 132 is placed in an arc-shaped groove on the inner sidewall of the sliding groove 131.

The structure of the limiting protrusion 142 is not limited. For example, as shown in FIG. 10 and FIG. 11, the limiting protrusion 142 is placed at an arc-shaped piece of the protrusion structure 141.

In some embodiments, as shown in FIG. 14, the connection device further includes a position limiting structure. The position limiting structure is placed on the first connector 110. The position limiting structure corresponds to the position of the protrusion structure 141. When the protrusion structure 141 slides in the sliding groove 131 until the protrusion structure 141 abuts the position limiting structure, the at least two connectors are at the first limit position.

The structure of the position limiting structure is not limited. For example, the position limiting structure may be a position stop piece located at an opening of the sliding groove 131.

In some embodiments, the at least two connectors are configured to support the flexible member 200. That is, the connection device may further be configured to support the flexible member 200. Thus, the connection device has strong applicability. At the same time, the first connector 110 of the adjacent connectors of the at least two connectors may be provided with a first connecting portion 130. The second connector 120 of the adjacent connectors of the at least two connectors may be provided with a second connecting portion 140. The first connecting portion 130 may be rotatably connected to the second connecting portion 140. The first connector 110 may rotate relative to the second connector 120 based on the rotating connection between the first connecting portion 130 and the second connecting portion 140. The at least two connectors may rotate to the first limit position and the second limit position based on the relative rotation between the first connector 110 and the second connector 120. As such, the connection device may be applied and rotate more flexibly.

Figure 15:
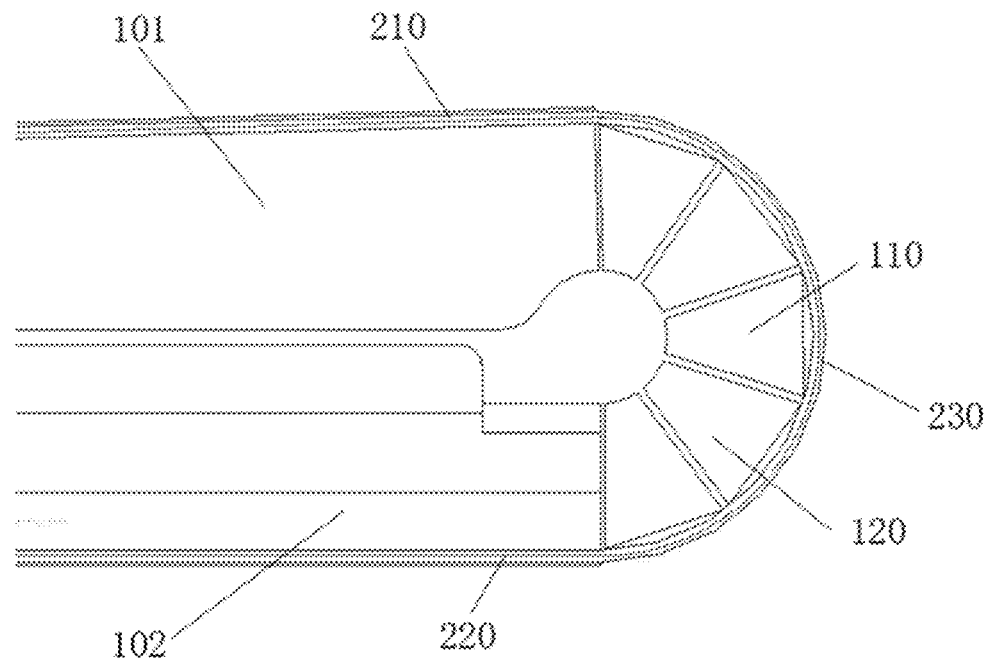
FIG. 15 illustrates a schematic local structural diagram of the connection device according to some embodiments of the present disclosure.
Figure 16:
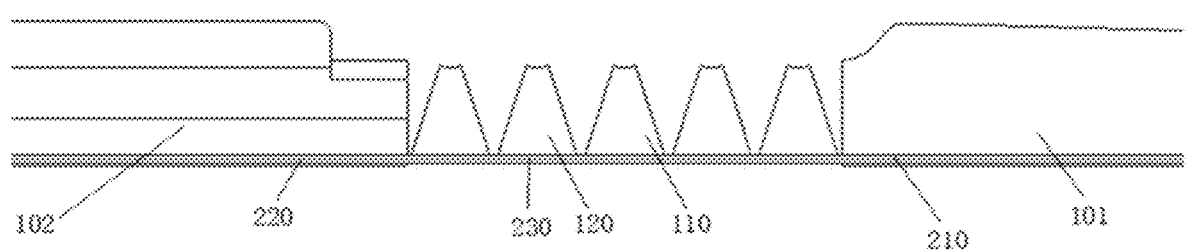
FIG. 16 illustrates a schematic local structural diagram of the connection device according to some embodiments of the present disclosure.
Figure 17:
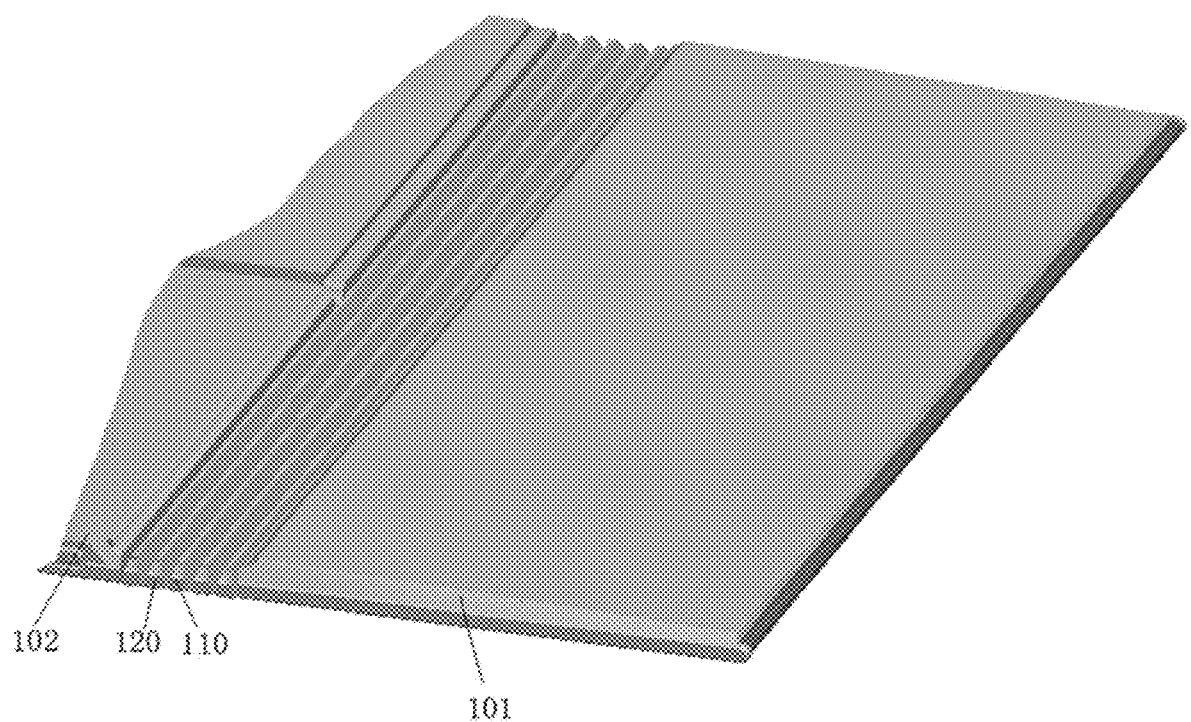
FIG. 17 illustrates a schematic local structural diagram of the connection device according to some embodiments of the present disclosure.

Embodiments of the present disclosure further disclose an electronic apparatus. The electronic apparatus includes the connection device of embodiments of the present disclosure, a first body 101, a second body 102, and a flexible member 200. The first body 101 is connected to a connector of a first end of the at least two connectors. The second body 102 is connected to a connector of a second end of the at least two connectors. The flexible member 200 includes a first flat portion 210, a second flat portion 220, and a bendable portion 230. The first flat portion 210 is fixed at the first body 101. The second flat portion 220 is fixed at the second body 102. The bendable portion 230 abuts the at least two connectors. As shown in FIG. 15, when the first body 101 rotates relative to the second body 102 through the at least two connectors, the at least two connectors are at the first limit position, the bendable portion 230 is in a bent state, and the first flat portion 210 and the second flat portion 220 are connected smoothly to the bendable portion 230. As shown in FIG. 16, when the at least two connectors are at the second limit position, the bendable portion 230 is in a flattened state, and the first flat portion 210 and the second flat portion 220 are in a same plane with the bendable portion 230. As such, the first flat portion 210, the second flat portion 220, and the bendable portion 230 form an integral structure as shown in FIG. 16 and FIG. 17.

In some embodiments, the structure of the electronic apparatus is not limited. For example, the electronic apparatus may include a cell phone, a computer, and a game console.

In some embodiments, the structures of the first body 101 and the second body 102 are not limited. For example, the first body 101 may be a body where a display device of the electronic apparatus is. The second body 102 may be a body where an input device of the electronic apparatus is. The first body 101 and the second body 102 may rotate to the first limit position and the second limit position through the connection device. When the first body 101 and the second body 102 are at the first limit position, the first body 101 and the second body 102 are in the folded state. At this point, the first body 101 may be fitted to or in parallel to the second body 102. When the first body 101 and the second body 102 are at the second limit position, the first body 101 and the second body 102 are in the unfolded state. At this point, the first body 101 and the second body 102 may be in the same plane.

How to connect the first body 101 to the connector of the first end of the at least two connectors is not limited. How to connect the second body 101 to the connector of the second end of the at least two connectors is not limited.

For example, the first body 101 may be fixedly connected to the first end of the at least two connectors. The second body 101 may be fixedly connected to the second end of the at least two connectors.

In another example, a third connecting portion is provided at a third connector on a first side of the at least two connectors. A fourth connecting portion is provided at a fourth connector on a second side of the at least two connectors. A fifth connecting portion is provided at the first body 101. The fifth connecting portion may be rotatably connected to the third connecting portion. A sixth connecting portion is provided at the second body 102. The sixth connecting portion is rotatably connected to the fourth connecting portion.

The third connecting portion may have the same structure as the first connecting portion 130 or the second connecting portion 140. The fourth connecting portion may have the same structure as the first connecting portion 130 or the second connecting portion 140. When the third connecting portion has the same structure as the first connecting portion 130, the fifth connecting portion may have the same structure as the second connecting portion 140. When the fourth connecting portion has the same structure as the first connecting portion 130, the sixth connecting portion may have the same structure as the second connecting portion 140.

In other embodiments, the third connecting portion may not have a same structure as the first connecting portion 130 or the second connecting portion 140. The fourth connecting portion may not have a same structure as the first connecting portion 130 or the second connecting portion 140.

In some embodiments, the structure of the flexible member 200 is not limited. For example, the flexible member 200 may be a protection piece of the electronic apparatus. For example, the flexible member 200 may be a leather piece of the electronic apparatus. In another example, the flexible member 200 may be a flexible display screen of the electronic apparatus.

The first flat portion 210 is fixed at the first body 101, such that the first flat portion 210 may move with the first body 101. The second flat portion 220 is fixed at the second body 102, such that the second flat portion 220 may move with the first body 102. The bendable portion 230 abuts the at least two connectors, such that the at least two connectors may support the bendable portion 230.

The bendable portion 230 is the bendable portion 230 of the flexible member 200 of the connection device of embodiments of the present disclosure. That is, the at least two connectors are configured to support the bendable portion 230 of the flexible member 200.

In embodiments of the present disclosure, the flexible member 200 of an electronic device may be placed in a folded position (FIG. 15) and a straight position (FIG. 16) using the first connector 110 and the second connector 120. In one example, the flexible member 200 may be a flexible display screen. The display screen may operate in both a folded position and a straight position with the support of the first connector 110 and the second connector 120.

The above-described embodiments are merely specific embodiments of the present disclosure. However, the scope of the present disclosure is not limited to these embodiments. Any skilled in the art familiar with the technology field may easily think of changes or replacements in the technical scope disclosed by the present disclosure. All these changes or replacements are within the scope of the present disclosure. Therefore, the scope of the present invention should be subject to the scope of the claims.

What is claimed is:

1. A connection device, comprising:
two adjacent connectors configured to support a flexible member, each of the two adjacent connectors including a large end and a small end, and the large end being configured to support the flexible member;
a first connecting portion of a first connector of the two adjacent connectors being rotatably connected to a second connecting portion of a second connector of the two adjacent connectors, wherein:
the first connector rotates relative to the second connector based on relative rotations between the first connecting portion and the second connecting portion;
the two adjacent connectors rotate to a first limit position and a second limit position based on the relative rotations between the first connector and the second connectors;
when the two adjacent connectors are at the first limit position, small ends of the two adjacent connectors have a first distance, and large ends of the two adjacent connectors have a second distance;
when the two adjacent connectors are at the second limit position, the small ends of the two adjacent connectors have a third distance, and the large ends of the two adjacent connectors have a fourth distance; and
the third distance is different from the first distance, and the fourth distance is different from the second distance.

2. The connection device of claim 1, wherein:
when the two adjacent connectors are at the first limit position, the two adjacent connectors are configured to support the flexible member in a bent state, and the flexible member contacts two supporting ends of each of the two adjacent connectors; and
when the two adjacent connectors are at the second limit position, the two adjacent connectors are configured to support the flexible member in an unfolded state, and the flexible member contacts a supporting surface of each of the two adjacent connectors.

3. The connection device of claim 1, wherein
the first connector rotates relative to the second connector about a rotation center based on the relative rotations between the first connecting portion and the second connecting portion;
the rotation center is on a side of the first connecting portion and the second connecting portion supporting the flexible member; and
the rotation center is outside the first connecting portion and the second connecting portion.

4. The connection device of claim 3, wherein:
when the two adjacent connectors are at the first limit position, the two adjacent connectors support the flexible member having a first length;
when the two adjacent connectors are at the second limit position, the two adjacent connectors support the flexible member having a second length; and
the first length equals to the second length.

5. The connection device of claim 1, wherein:
the first connecting portion includes a first arc surface;
the second connecting portion includes a second arc surface;
the second arch surface contacts the first arc surface and rotates relative to the first arc surface about a first rotation center; and
the first connector rotates relative to the second connector based on relative rotations between the first arc surface and the second arc surface.

6. The connection device of claim 5, wherein:
the first connector rotates relative to the second connector based on the relative rotations between the first arc surface and the second arc surface when an external force is applied; and the first connector maintains relative position with the second connector based on friction between the first arc surface and the second arc surface when the external force is removed.

7. The connection device of claim 5, wherein:
the first connecting portion includes a circular sliding groove;
a sidewall of the sliding groove forms the first arc surface;
the second connecting portion includes a circular protrusion structure;
the circular protrusion structure is inserted in the sliding groove and rotates relative to the sliding groove about the first rotation center; and
a sidewall of the protrusion structure forms the second arc surface.

8. The connection device of claim 7, further comprising:
a limiting groove provided on an inner wall of the sliding groove;
a limiting protrusion piece provided on the protrusion structure and corresponding to a position of the limiting groove, wherein:
when the protrusion structure slides in the sliding groove, the limiting protrusion piece slides in the limiting groove; and
when the limiting protrusion piece abuts a sidewall of the limiting groove, the two adjacent connectors are at the second limit position;
a position limiting structure provided on the first connector and corresponding to a position of the protrusion structure, wherein:
when the protrusion structure slides in the sliding groove until abutting the position limiting structure, the two adjacent connectors are at the first limit position.

9. An electronic apparatus, comprising: the connection device of claim 1;
a first body connected to a connector of a first end of the two adjacent connectors;
a second body connected to a connector of a second end of the two adjacent connectors; and
a flexible member including:
a first flat portion fixed at the first body;
a second flat portion fixed at the second body; and
a bendable portion abutting the two adjacent connectors;
wherein:
when the first body rotates relative to the second body through the two adjacent connectors, the two adjacent connectors are at the first limit position, the bendable portion is in a bent state, and the first flat portion and the second flat portion are connected smoothly to the bendable portion in the bent state; and
when the two adjacent connectors are at the second limit position, the bendable portion is in a flattened state, and the first flat portion and the second flat portion are in a same plane with the bendable portion.

10. The electronic apparatus of claim 9, wherein:
when the two adjacent connectors are at the first limit position, the two connectors are configured to support the flexible member in a bent state, and the flexible member contacts two supporting ends of each of the two adjacent connectors; and
when the two adjacent connectors are at the first limit position, the two adjacent connectors are configured to support the flexible member in an unfolded state, and the flexible member contacts a supporting surface of each of the two adjacent connectors.

11. The electronic apparatus of claim 9, wherein
the first connector rotates relative to the second connector about a rotation center based on the relative rotation between the first connecting portion and the second connecting portion;
the rotation center is on a side of the first connecting portion and the second connecting portion supporting the flexible member; and
the rotation center is outside the first connecting portion and the second connecting portion.

12. The electronic apparatus of claim 11, wherein:
when the two adjacent connectors are at the first limit position, the two adjacent connectors support the flexible member having a first length;
when the two adjacent connectors are at the second limit position, the two adjacent connectors support the flexible member having a second length; and
the first length is equal to the second length.

13. The electronic apparatus of claim 9, wherein:
the first connecting portion includes a first arc surface;
the second connecting portion includes a second arc surface;
the second arch surface contacts the first arc surface and rotates relative to the first arc surface about a first rotation center; and
the first connector rotates relative to the second connector based on relative rotation between the first arc surface and the second arc surface.

14. The electronic apparatus of claim 13, wherein:
the first connector rotates relative to the second connector based on the relative rotation between the first arc surface and the second arc surface when an external force is applied; and
the first connector maintains relative position with the second connector based on friction between the first arc surface and the second arc surface when the external force is removed.

15. The electronic apparatus of claim 13, wherein:
the first connecting portion includes a circular sliding groove;
a sidewall of the sliding groove forms the first arc surface;
the second connecting portion includes a circular protrusion structure;
the circular protrusion structure is inserted in the sliding groove and rotates relative to the sliding groove about the first rotation center; and
a sidewall of the protrusion structure forms the second arc surface.

16. The electronic apparatus of claim 15, further comprising:
a limiting groove provided on an inner wall of the sliding groove;
a limiting protrusion piece provided on the protrusion structure and corresponding to a position of the limiting groove, wherein:
when the protrusion structure slides in the sliding groove, the limiting protrusion piece slides in the limiting groove; and
when the limiting protrusion piece abuts a sidewall of the limiting groove, the two adjacent connectors are at the second limit position;
a position limiting structure provided on the first connector and corresponding to a position of the protrusion structure, wherein:

when the protrusion structure slides in the sliding groove until abutting the position limiting structure, the two adjacent connectors are at the first limit position.

17. A connection device, comprising:
two adjacent connectors configured to support a flexible member;
a first connecting portion of a first connector of the two adjacent connectors being rotatably connected to a second connecting portion of a second connector of the two adjacent connectors, wherein:
the first connector rotates relative to the second connector based on relative rotations between the first connecting portion and the second connecting portion;
the two adjacent connectors rotate to a first limit position and a second limit position based on the relative rotations between the first connector and the second connector;
when the two adjacent connectors are at the first limit position, the two adjacent connectors are configured to support the flexible member in a bent state, and the flexible member contacts two supporting ends of each of the two adjacent connectors; and
when the two adjacent connectors are at the second limit position, the two adjacent connectors are configured to support the flexible member in an unfolded state, and the flexible member contacts a supporting surface of each of the two adjacent connectors.

* * * * *